(12) United States Patent
Tanaka

(10) Patent No.: US 7,086,744 B2
(45) Date of Patent: Aug. 8, 2006

(54) OPTICAL UNIT FOR PROJECTION TYPE IMAGE DISPLAY APPARATUS

(75) Inventor: Hidetomo Tanaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/791,943

(22) Filed: Mar. 2, 2004

(65) Prior Publication Data

US 2004/0174502 A1  Sep. 9, 2004

(30) Foreign Application Priority Data

Mar. 5, 2003  (JP) .............................. 2003-058923

(51) Int. Cl.
*G03B 21/14* (2006.01)
*G02F 1/1335* (2006.01)

(52) U.S. Cl. .......................... 353/81; 353/33; 353/119; 348/750; 348/757; 349/58; 349/60

(58) Field of Classification Search ................. 353/20, 353/33, 56, 52, 69, 81, 119, 31; 348/750, 348/751, 755–757, 794; 349/8, 9, 58, 60
See application file for complete search history.

(56) References Cited

U.S. PATENT DOCUMENTS 6,053,616 A * 4/2000 Fujimori et al. ............ 353/119

6,460,998 B1 * 10/2002 Watanabe .................... 353/20
6,657,680 B1 * 12/2003 Takizawa ..................... 349/5
6,829,110 B1 * 12/2004 Watanabe ................... 359/822
6,833,953 B1 * 12/2004 Miyazawa et al. .......... 359/486
6,854,849 B1 * 2/2005 Suzuki et al. ................ 353/33

FOREIGN PATENT DOCUMENTS

JP  2001-154268  6/2001
JP  2002-221758  8/2002

* cited by examiner

*Primary Examiner*—W. B. Perkey
*Assistant Examiner*—Andrew Sever
(74) *Attorney, Agent, or Firm*—Morgan & Finnegan, LLP

(57) ABSTRACT

An optical unit for projection type image display apparatus, by which the occurrence of registration deviation can be restrained and projected images of high contrast can be obtained, is disclosed. This optical unit comprises a first optical element which performs at least one of color separation and color combination; a holding member attached to the first optical element; and a second optical element which optically acts on one of incident light on the first optical element and emergent light from the first optical element. The linear expansion coefficients a1, a2, and a3 of the materials forming the first optical element, the second optical element, and the holding member have the following relationship:

$$a1 < a3 \leq a2.$$

8 Claims, 9 Drawing Sheets

OPTICAL UNIT FOR PROJECTION TYPE IMAGE DISPLAY APPARATUS

BACKGROUND OF THE INVENTION

1. Field of the Invention

This invention relates to a projection type image display apparatus, such as a liquid crystal projector, etc., and to be more detailed, relates to an optical unit to be used in a projection type image display apparatus.

2. Description of the Related Art

Japanese Patent Application Laid-open No. 2001-154268 proposes an example of an arrangement using a prism type element which performs color separation or color combination of light and a wavelength-selective polarization rotating element in an optical unit for a liquid crystal projector. This publication proposes, as a method of holding the wavelength-selective polarization rotating element, a method of direct, surface adhesion onto the prism type element.

The same publication also proposes an optical configuration in which the wavelength-selective polarization rotating element is separated from the prism type element.

Also as a method of holding and cooling a polarizing plate, Japanese Patent Application Laid-open No. 2002-221758 proposes an art of providing a polarizing plate between a liquid crystal panel and a prism type element, serving as a color combining element, and cooling the polarizing plate by providing spaces at both sides thereof.

However, the following problems occur when a wavelength-selective polarization rotating element is surface-adhered directly onto a prism type element as in the optical unit disclosed in Japanese Patent Application Laid-open No. 2001-154268.

That is, the material of a prism type element is glass and the linear expansion coefficient thereof is approximately $0.4 \times 10^{-5}$. On the other hand, a wavelength-selective polarization rotating element is manufactured by multiple layering of polycarbonate and the linear expansion coefficient thereof is approximately 3 to $6 \times 10^{-5}$ and thus approximately 10 times that of glass. When in a case where such materials which greatly differ in linear expansion coefficient are fixed together by surface adhesion, a temperature rise occurs due to the driving of the projection type image display apparatus, internal stress will occur at the adhesion surfaces of both elements, giving rise to photoelasticity (birefringence) in the elements and leading to the lowering of contrast of a projected image.

The causes of temperature rise include the absorption of light from the light source by the polarizing plate in the normal driving of the projection type image display apparatus. Other causes include light energy absorption at the dielectric film surface (polarization separating surface) of a polarization beam splitter, which is a prism type element, and light energy absorption by the prism type element itself. A liquid crystal panel which is fixed to the prism type element is also a major light energy absorption source, and the heat from the liquid crystal panel can heat the prism type element by radiation or the prism type element can be heated by conduction of heat via an indirect member for fixing the liquid crystal panel to the prism type element.

Also, though comparatively low, there is light energy absorption by the wavelength-selective polarization rotating element itself since its transmittance is not 100%.

When the prism type element and the wavelength-selective polarization rotating element are heated by such light energy absorption and temperature rise inside the apparatus and photoelasticity occurs in the two elements, the polarization characteristics become distorted and since light which basically should not be made to enter the projection lens is transmitted, the contrast of the projected image is lowered.

Also, if in order to avoid the above problem, the wavelength-selective polarization rotating element is separated from the prism type element and simply held by another member, the optical axis may fluctuate and so-called registration deviation (display deviation in pixel units of a multiple color image) may occur.

For example, as a holding method based on the optical configuration diagram of Japanese Patent Application Laid-open No. 2002-221758, prisms may be fixed strongly to each other to form a unit, and another part, such as a polarizing plate or a wavelength-selective polarization rotating element, may be held separately by a member which holds the prism unit. In this case, when the member which holds the other element with respect to the prism unit undergoes deformation or rotation, the optical element besides the prism type element becomes tilted, thereby causing registration deviation.

A polarizing plate may be adhered directly to a prism type element, which combines light of three colors and with which the influence of photoelasticity is comparatively low (since light which is shifted in polarization due to the photoelasticity which occurs inside the prism type element is absorbed by the polarizing plate, the influence on display deviation of an image is low), to prevent tilting. However, it is not preferable to adhere a wavelength-selective polarization rotating element directly to a prism type element due to the reasons given above.

In a case where the wavelength-selective polarization rotating element is to be held by the member holding the prism element, the wavelength-selective polarization rotating element cannot be fixed strongly since the transmission wave plane will become distorted and the image will be degraded if arrangements are not made to prevent the occurrence of deflection in the wavelength-selective polarization rotating element.

SUMMARY OF THE INVENTION

An object of this invention is to provide an optical unit and a projection type image display apparatus, with which the leakage of light from optical elements, such as a wavelength-selective polarization rotating element, etc., and the occurrence of registration deviation due to the tilting of such optical elements can be restrained, thereby enabling projected images of high contrast to be obtained.

In order to achieve the above object, one aspect of this invention provides an optical unit comprising: a first optical element formed of a glass material; a holding member, attached to the first optical element; and a second optical element, held by the holding member. The first optical element performs at least one of color separation and color combination of light. The second optical element is formed of a resin material and acts optically on one of incident light onto the first optical element and emergent light from the first optical element.

Here, the following condition is satisfied:

$$a1 < a3 \leq a2$$

where a1, a2, and a3 represent linear expansion coefficients of the materials forming the d first optical element, the second optical element, and the holding member, respectively.

Another aspect of this invention provides an optical unit comprising: a first optical element which performs at least one of color separation and color combination of light; a holding member, attached to the first optical element; and a second optical element, held by the holding member. The second optical element acts optically on one of incident light onto the first optical element and emergent light from the first optical element.

Here, the holding member has a holding structure which holds the second optical element. This holding structure prevents the displacement of the second optical element in the direction of an optical axis of the first optical element which passes through the second optical element and allowing displacement of the second optical element in a direction orthogonal to this optical axis direction.

Another aspect of this invention is to provide an optical system used in a projection type image display apparatus comprises a first optical element which has a first linear expansion coefficient, and the first optical element performs at least one of color separation and color combination of light. Furthermore, the optical system used in a projection type image display apparatus comprises a second optical element which has a second linear expansion coefficient, and the second optical element acts optically on one of incident light onto the first optical element and emergent light from the first optical element. Furthermore the optical system used in a projection type image display apparatus comprises a holding member which has a third linear expansion coefficient, and the holding member holds the second optical element with respect to the first optical element. Herein the third linear expansion coefficient is one of a coefficient which is substantially the same as the second linear expansion coefficient and a coefficient which is closer to the second linear expansion coefficient than to the first linear expansion coefficient.

Another aspect of this invention is to provide an optical system used in a projection type image display apparatus comprises a first optical element which performs at least one of color separation and color combination of light, a second optical element which acts optically on one of incident light onto the first optical element and emergent light from the first optical element and a holding member which holds the second optical element with respect to the first optical element. Herein, the holding member includes a supporting portion which supports a first surface of the second optical element, and an elastic portion which presses a second surface, opposite the first surface, towards the side of the supporting portion.

Another aspect of this invention is to provide an optical system comprises a color separation element which separates light into a first color light, a second color light and a third color light, a color combining element which performs color combination of the first color light, the second color light and the third color light, and a first polarization beam splitter which guides the first color light from the color separation element to a first image forming element and guides the first color light from the first image forming element to the color combining element and a second polarization beam splitter which guides the second color light from the color separation element to a second image forming element, guides the second color light from the second image forming element to the color combining element, guides the third color light from the color separation element to a third image forming element, and guides the third color light from the third image forming element to the color combining element. Furthermore the optical system comprises a base which holds the color separation element, the color combining element, the first polarization beam splitter, and the second polarization beam splitter. Furthermore, a first substrate holds the first polarization beam splitter with respect to the color combining element, and a second substrate holds the second polarization beam splitter with respect to the color combining element.

Another aspect of this invention is to provide a projection type image display apparatus comprises a light source, a color separation element which separates light into a first color light, a second color light and a third color light, and a first image forming element, a second image forming element and a third image forming element. Furthermore, a color combining element performs color combination of the first color light, the second color light and the third color light, a projection optical system projects light from the color combining element, a first polarization beam splitter guides the first color light from the color separation element to the first image forming element and guides the first color light from the first image forming element to the color combining element and a second polarization beam splitter guides the second color light from the color separation element to the second image forming element, guides the second color light from the second image forming element to the color combining element, guides the third color light from the color separation element to the third image forming element and guides the third color light from the third image forming element to the color combining element. Furthermore, the projection type image display apparatus comprises a base which holds the color separation element, the color combining element, the first polarization beam splitter and the second polarization beam splitter, a first substrate which holds the first polarization beam splitter with respect to the color combining element and a second substrate which holds the second polarization beam splitter with respect to the color combining element.

Characteristics of an optical system, an optical unit and a projection type image display apparatus of this invention shall be made clear by the following description of specific embodiments with reference to the drawings.

DETAILED DESCRIPTION OF THE PREFERRED EMBODIMENTS

Embodiments of this invention shall now be described with reference to the drawings.

(Embodiment 1)

Figure 1:
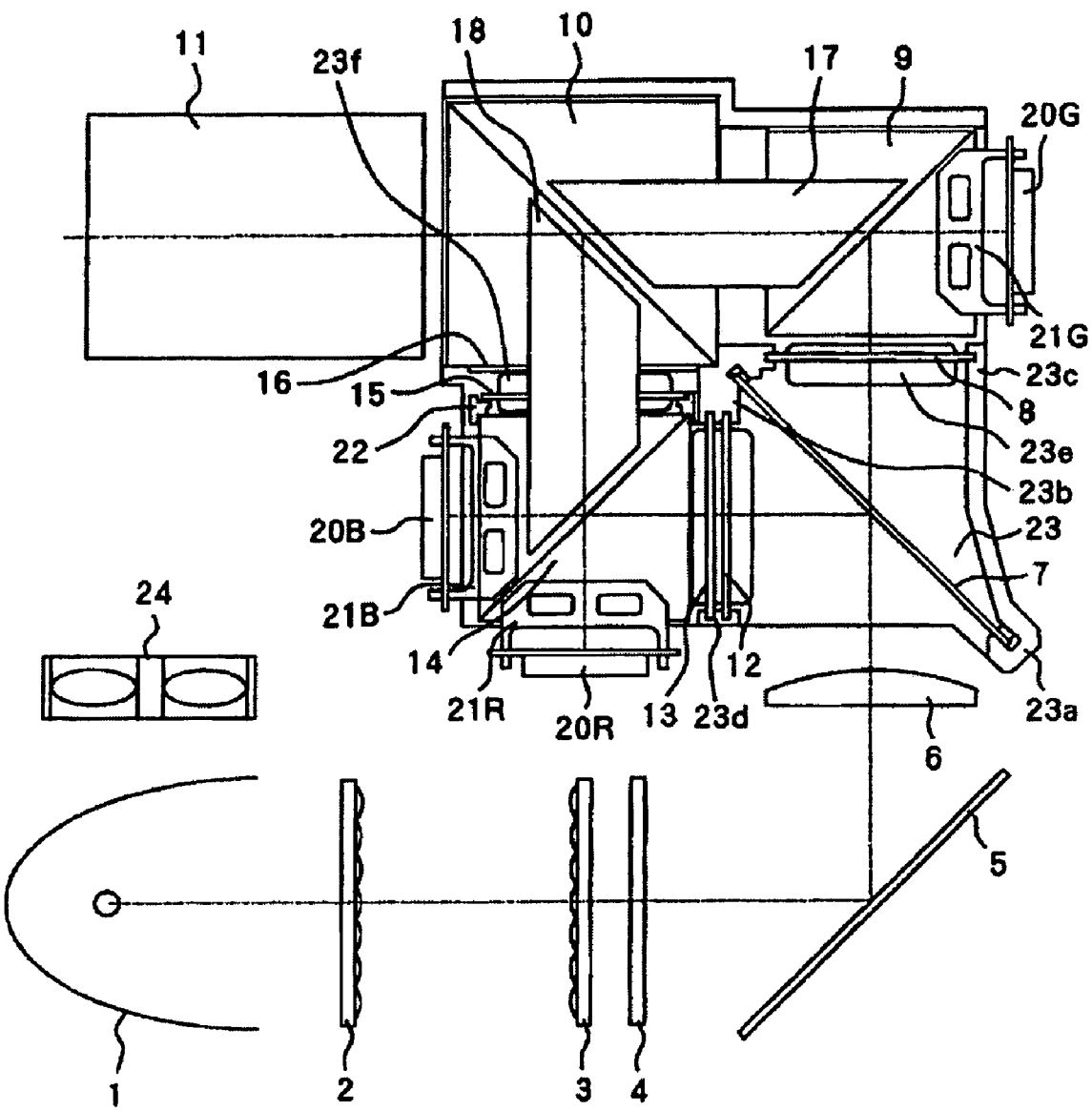
FIG. 1 is a plan view showing the arrangement of an optical unit for liquid crystal projector, which is Embodiment 1 of this invention.

FIG. 1 shows the arrangement of an optical unit for liquid crystal projector (projection type display apparatus), which is Embodiment 1 of this invention.

Reference numeral 1 denotes a light source which emits white light with a continuous spectrum, and mainly, an extra-high pressure mercury lamp, etc. is used.

Reference numeral 2 denotes a first fly-eye lens array, having rectangular lenses positioned in matrix form, and reference numeral 3 denotes a second fly-eye lens array, having an array of lenses corresponding to the individual lenses of the first fly-eye lens array 2.

Reference numeral 4 denotes a polarization converting element, which aligns non-polarized light into light of a specific polarization direction, and reference numeral 5 denotes a total reflection mirror which bends the optical path. Reference numeral 6 denotes a field lens.

Reference numeral 7 denotes a dichroic mirror (color separation element) which reflects R (red) and B (blue) light components and transmits G (green) light component. Reference numeral 8 denotes a G polarizing plate for absorbing P-polarized light, which has not been converted into S-polarized light by the polarization converting element 4 and with which the polarization has been distorted in the process of passage through the dichroic mirror 7.

Reference numeral 9 denotes a G polarization beam splitter (first polarization beam splitter), which transmits P-polarized light and reflects S-polarized light. Reference numeral 10 denotes a combining polarization beam splitter (color combining element) for combining R, G, and B light components. The combining polarization beam splitter 10 may be replaced by a dichroic mirror or a dichroic prism.

Reference numeral 11 denotes a projection lens for magnifying and projecting the light components, combined by the combining polarization beam splitter 10, onto an unillustrated screen or other projected surface.

Reference numeral 12 denotes an RB polarizing plate, which is the same in polarization axis direction as the G polarizing plate 8. The RB polarizing plate 12 is also provided for absorbing P-polarized light, which has not been converted into S-polarized light by the polarization converting element 4 and with which the polarization has been distorted in the process of reflection by the dichroic mirror 7.

Reference numeral 13 denotes a wavelength-selective polarization rotating element and is for rotating by 90° the polarization direction of just a B light component in an RB light components which has been transmitted through the RB polarizing plate 12.

Reference numeral 14 denotes an RB polarization beam splitter (second polarization beam splitter) and performs color separation by reflecting the R light component as it is in the S-polarized state after transmission through the wavelength-selective polarization rotating element 13 and transmitting the B light component which has been converted into P-polarized light.

Reference numeral 15 denotes a wavelength-selective polarization rotating element and is for rotating by 90° the polarization direction of just an R light component of an RB light components which emerges from the RB polarization beam splitter 14, and the polarization directions of the R light component and the B light component are aligned here.

Reference numeral 16 denotes an emergence side polarization plate, which absorbs polarized light besides the S-polarized light of R and B light components which have been aligned in polarization direction at the wavelength-selective polarization rotating element 15. The emergence side polarizing plate 16 is adhered onto the combining polarization beam splitter 10. This is done in order to radiate heat towards the combining polarization beam splitter 10, which is large in heat capacity, so that the emergence side polarizing plate 16 will not break and to prevent registration deviation, which may occur if the polarizing plate is adhered onto a substrate glass with a thickness of approximately 1.1 mm and held independently.

However, if for reasons of manufacture, etc., the emergence side polarizing plate 16 cannot be adhered onto the polarization beam splitter 10, it may be held independently with the registration deviation being taken into consideration. Or, the same method as a method, to be described below, of making the wavelength-selective polarization rotating element 15 be held by the RB polarization beam splitter 14 via an indirect holding member (holding frame 22) may be employed.

Reference numeral 17 denotes a glass plate (first substrate) G for strongly connecting the G polarization beam splitter 9 and the combining polarization beam splitter 10. Reference numeral 18 denotes a glass plate (second substrate) RB for strongly connecting the RB polarization beam splitter 14 and the combining polarization beam splitter 10. The glass plates 17 and 18 are for strongly fixing the three polarization beam splitters 9, 10, and 14 to each other so that their relative positions will not deviate due to temperature rises during normal operation.

Reference numerals 20 denote reflection type liquid crystal display elements, and in the present embodiment, reflection type liquid crystal display elements (referred to hereinafter as "liquid crystal panels") 20G, 20R, and 20B are provided, one for each of the R, G, and B light components.

Reference numerals 21R, 21G, and 21B denote liquid crystal panel holding plates and are members which hold the liquid crystal panels 20G, 20R, and 20B. The liquid crystal panel holding plate 21G is fixed by adhesion to the G polarization beam splitter 9 and the liquid crystal panel holding plates 21R and 21B are fixed by adhesion to the RB polarization beam splitter 14.

Reference numeral 22 denotes a holding frame for making the wavelength-selective polarization rotating element 15 be held by the RB polarization beam splitter 14. Reference numeral 23 denotes a base which mainly holds the combining polarization beam splitter 10.

The dichroic mirror 7 is dropped inside grooves formed in column portions 23a and 23b which are formed integral to the base 23 and is held without play by the sandwiching of sponges. The G polarizing plate 8 is dropped inside grooves formed in the column portion 23b and in a wall portion 23c, formed integral to the base 23, and is held with a predetermined amount of play.

Furthermore, the RB polarizing plate 12 and the wavelength-selective polarization rotating element 13 are dropped inside grooves formed respectively in the column portion 23b and in a wall portion 23d, which is formed integral to the base 23, and are held with predetermined amounts of play.

The G polarization beam splitter 9 and the RB polarization beam splitter 14 are not held directly by the base 23 but are indirectly held by the filling of the gaps with respect to the base 23 by a soft adhesive agent provided as a countermeasure against vibration, impacts due to dropping, etc.

Reference numeral 24 denotes a cooling fan for the light source 1 and is provided for making the bulb temperature of the light source lamp an appropriate temperature as well as for exhausting air so that high-temperature air will not stagnate inside the casing of the projector.

The optical unit is arranged as described above. A more detailed description concerning color separation, color combination, and image display shall now be provided.

White light from the light source 1, which is optically manipulated by the parts of the illumination system up to a condenser lens 6 so as to be uniform in illuminance across the effective image ranges of liquid crystal panels 20R, 20G, and 20B and is aligned as S-polarized light, is first separated by the dichroic mirror 7 into G light component and the light component of R and B.

The G light, which is the S-polarized light transmitted through the dichroic mirror 7 and analyzed by the G polarizing plate 8, is reflected by the polarization separating surface of the G polarization beam splitter 9 and made incident on the liquid crystal panel 20G. In the case of a black display, the S-polarized light which is made incident on the liquid crystal panel 20G is reflected as it is in the S-polarized state and is returned towards the light source 1 back through the path in which it was lead priorly. In the case of a white display, the light is converted into P-polarized light at the liquid crystal panel 20G, transmitted through the polarization separating surface of the G polarization beam splitter 9, transmitted through the polarization separating surface of the combining polarization beam splitter 10 as well, and directed towards the projection lens 11.

Meanwhile, the RB light components which are reflected by the dichroic mirror 7 is analyzed by the RB polarizing plate 12, and at the wavelength-selective polarization rotating element 13, just the B light component is converted from S-polarized light into P-polarized light. The R light component, which is the S-polarized light of the RB light components which have passed through the wavelength-selective polarization rotating element 13, is reflected by the polarization separating surface of the RB polarization beam splitter 14 and made incident on the liquid crystal panel 20R, and the B light component which is the P-polarized light is transmitted through the polarization separating surface of the RB polarization beam splitter 14 and made incident on the liquid crystal panel 20B. The RB light components are thus color separated at the RB polarization beam splitter 14 and made incident on the liquid crystal panels 20R and 20B, respectively.

As with the G light component, in the case of a black display, the R light component and the B light component are reflected by liquid crystal panels 20R and 20B without being converted in polarization direction and are returned through the paths taken priorly and directed towards the light source 1. In the case of a white display, the R light component is converted from S-polarized light to P-polarized light at the liquid crystal panel 20R, transmitted through the polarization separating surface of the RB polarization beam splitter 14, converted into S-polarized light by transmission through the wavelength-selective polarization rotating element 15, analyzed by the emergence side polarizing plate 16, reflected by the polarization separating surface of the combining polarization beam splitter 10, and directed towards the projection lens 11.

Also in the case of a white display, the B light component is converted from P-polarized to S-polarized light at the liquid crystal panel 20B, reflected by the polarization separating surface of the RB polarization beam splitter 14, transmitted through the wavelength-selective polarization rotating element 15 without being converted in polarization, analyzed by the emergence side polarizing plate 16, reflected by the polarization separating surface of the combining polarization beam splitter 10, and directed towards the projection lens 11.

The RB light components are thus color combined at the RB polarization beam splitter 14 and the RGB light components are color combined at the combining polarization beam splitter 10, the white light uniformed.

Though cases where all effective pixels of the liquid crystal panels 20R, 20G, and 20B are switched simultaneously were described above, image information may also be reproduced by controlling the polarization according to pixel. A color projection image which is color combined is then obtained by reproduction control of the image information according to the respective colors of RGB.

A method of holding the wavelength-selective polarization rotating element 13 and the wavelength-selective polarization rotating element 15 shall now be described. Priorly, each of the wavelength-selective polarization rotating elements B and R generally had substrate glass adhered to both sides thereof and was then adhered directly onto the RB polarization beam splitter. The wavelength-selective polarization rotating elements B and R were thus heated due to light energy absorption and upon expansion, internal stress arose due to the difference in linear expansion coefficient with respect to the substrate glass, thereby causing photoelasticity. This occurred because whereas polycarbonate, which is the main material of a wavelength-selective polarization rotating element, has a linear expansion coefficient of approximately 3 to $6\times10^{-5}$, substrate glass has a linear expansion coefficient of approximately $0.4\times10^{-5}$ and there is thus a ten-fold difference.

When photoelasticity occurs, the polarization is distorted, and in the final stage, the contrast of the projected image is lowered. The influence of photoelasticity is significant at the wavelength-selective polarization rotating element B. Thus with the present embodiment, the wavelength-selective polarization rotating element 13 is held independently with play by the base 23 as mentioned above. Since the wavelength-selective polarization rotating element 13 can thus expand freely and yet uniformly, internal stress will not arise and the occurrence of photoelasticity is restrained.

The occurrence of photoelasticity may likewise be restrained at the wavelength-selective polarization rotating element 15 by making it be held independently with play by the base 23. However, since there is the other problem of occurrence of registration deviation due to the reasons to be described below, the wavelength-selective polarization rotating element 15 is arranged to be held integrally by the RB polarization beam splitter 14 via the holding frame 22 in the present embodiment.

Figure 9:
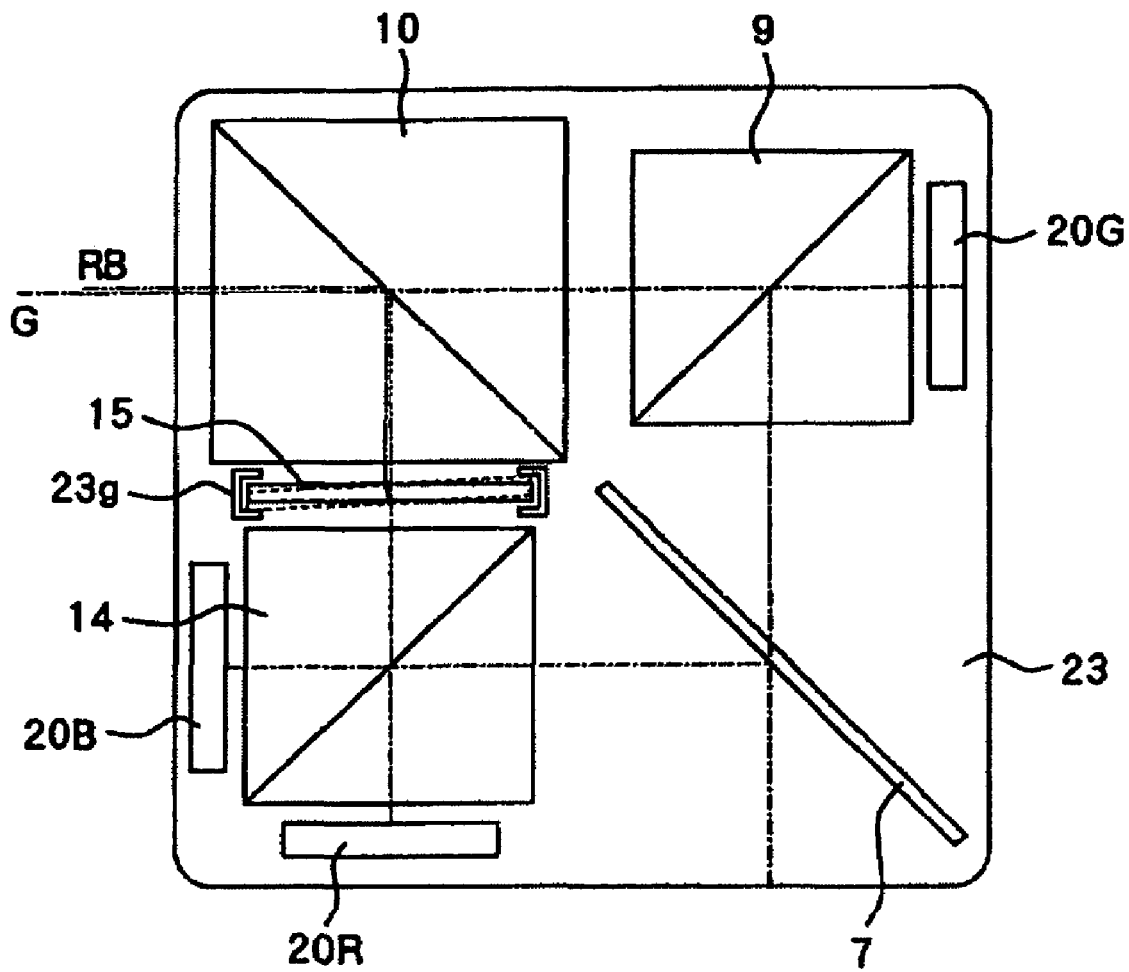
FIG. 9 is a plan view for describing an occurrence of registration deviation due to displacement of a wavelength-selective polarization rotating element.

The reason why registration deviation occurs when the wavelength-selective polarization rotating element 15 is held independently by the base 23 shall now be described using FIG. 9. FIG. 9 shows an example where the wavelength-selective polarization rotating element 15 is held with play inside grooves of column portions 23g which are formed integral to the base 23. Only the optical elements necessary for the description here are shown in FIG. 9.

The wavelength-selective polarization rotating element 15 is disposed between the liquid crystal panels 20R and 20B and the projection lens 11 and when the wavelength-selective polarization rotating element 15 becomes tilted, the optical axis from the wavelength-selective polarization rotating element 15 onwards and up to the projection lens 11 becomes displaced. In the figure, the original optical axis is indicated by alternate long and short dash lines and a displaced optical axis is indicated by alternate long and two short dashes lines.

As can be understood from the figure, when the wavelength-selective polarization rotating element 15 becomes tilted, only the optical axis of the RB light components becomes displaced even though the optical axis of G light component is not displaced. As a result, registration deviation occurs.

Though there is also a method of filling the gaps, corresponding to the play between the wavelength-selective polarization rotating element 15 and the column portion 23g, with sponges or other cushioning members to prevent the tilting of the wavelength-selective polarization rotating element 15, this will be premised on the base 23 being extremely strong and undergoing hardly any deformation due to heat. This is because generally when an optical unit is incorporated in a projector casing, base 23 is fixed onto the projector casing using machine screws, and when base 23 becomes deformed in this process, the positional relationships of the optical elements when the liquid crystal panels are adjusted and fixed to the optical unit will differ from those when the base 23 is fixed by machine screws onto the projector casing, thereby giving rise to registration deviation.

In addition, the temperature inside the projector rises to approximately 40° C. to 60° C. during operation and this can cause deformation of the base 23 even if so slightly. Though the base 23 has a simple, single, rectangular shape in FIG. 8, it will actually have a considerably complex shape due to the holding of optical parts, the forming of holes for cooling, etc. The base 23 will therefore not undergo uniform thermal expansion and this will cause the wavelength-selective polarization rotating element 15 to tilt and registration deviation to occur.

Figure 2:
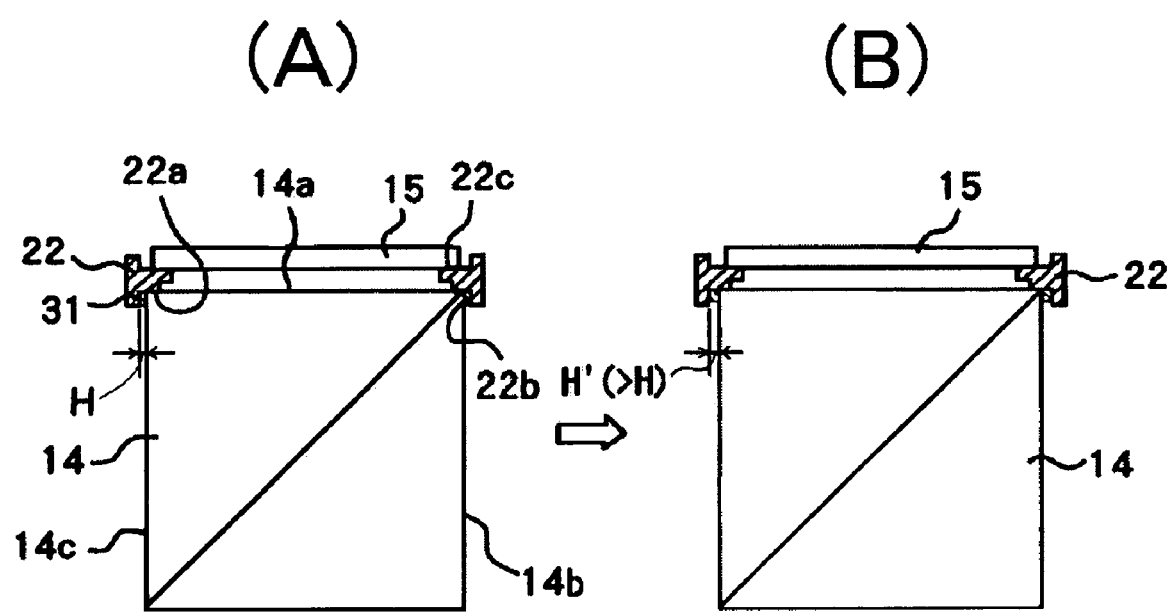
FIGS. 2(A) 2(B) are, respectively, plan views for describing a method by which a wavelength-selective polarization rotating element is held via a holding member by a polarization beam splitter in the optical unit of Embodiment 1.

Due to such reasons, the wavelength-selective polarization rotating element 15 is arranged to be held by the RB polarization beam splitter 14 via the holding frame 22 in the present embodiment. FIG. 2 shows plan views for describing this holding structure in more detail and FIG. 3 is a perspective view of holding frame 22.

Figure 3:
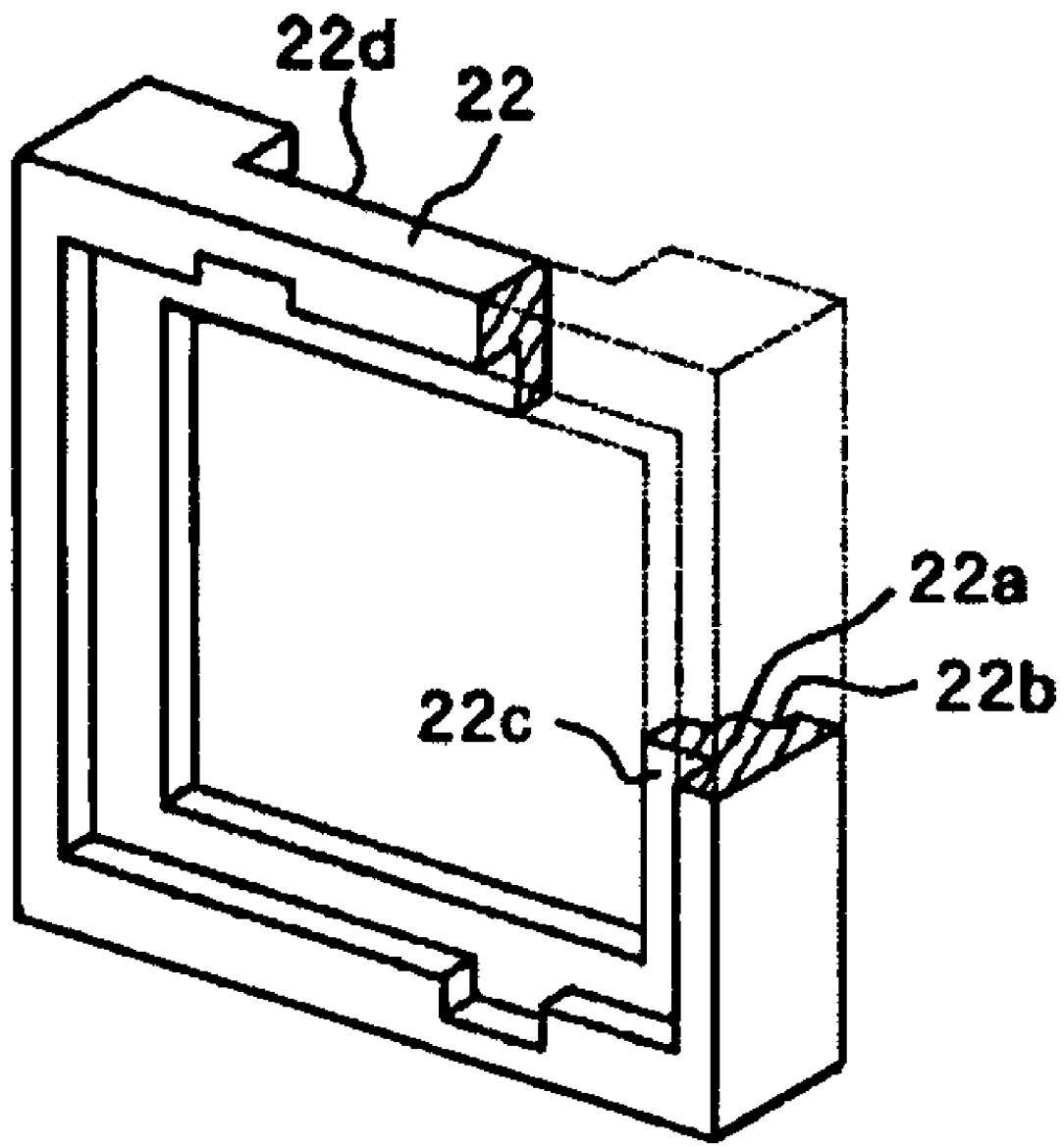
FIG. 3 is a perspective view of the holding member.

As shown in FIG. 2(A) and FIG. 3, holding frame 22 has a beam splitter side reference surface 22a, which contacts peripheral portions of the RB light components emergence surface 14a of the RB polarization beam splitter 14, an adhered surface 22b, which is positioned across gaps H (see FIG. 2(A)) from peripheral portions of the incidence surface 14b of the RB polarization beam splitter 14 for the RB light components from the illumination system and peripheral portions of the B light component incidence/emergence surface 14c which opposes the liquid crystal panel 20B, and a polarization rotating element side reference surface 22c, which is formed parallel to the beam splitter side reference surface 22a at the side opposite the reference surface 22a and is put in contact with the wavelength-selective polarization rotating element 15.

As shown in FIG. 2(A), an adhesive agent (first adhesive agent) 31 is applied between the adhered surface 22b and the incidence surface 14b and the incidence/emergence surface 14c of the RB polarization beam splitter 14.

The material of the holding frame 22 is polycarbonate, which is the same (and same in linear expansion coefficient) as the principal material of the wavelength-selective polarization rotating element 15, or is a, material with a linear expansion close to which of polycarbonate coefficient (or at least closer to the linear expansion coefficient of polycarbonate than the linear expansion coefficient of glass, which is the material of the RB polarization beam splitter 14).

In this case, when the wavelength-selective polarization rotating element 15 expands due to a temperature rise, an equivalent expansion occurs at the holding frame 22 and the stress in the wavelength-selective polarization rotating element 15 can thus be relieved.

With the present embodiment, if the linear expansion coefficients of the materials forming the RB polarization beam splitter (first optical element) 14, the wavelength-selective polarization rotating element (second optical element) 15, and the holding frame 22 are a1, a2, and a3, respectively, the following condition is satisfied:

$$a1 < a3 \leq a2.$$

Figure 4A:
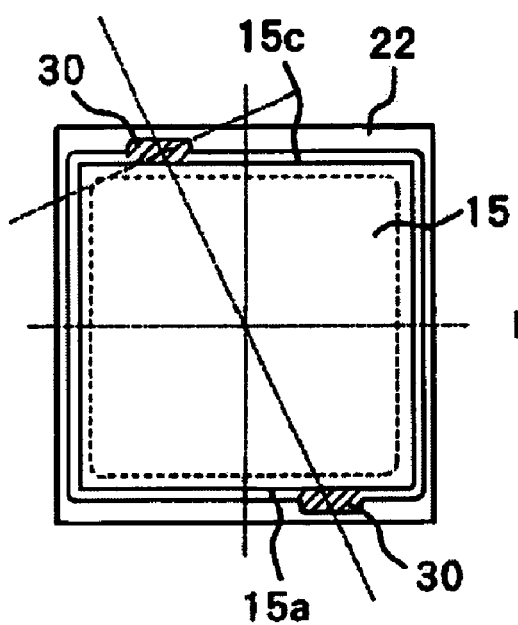
FIGS. 4(A) 4(B) are, respectively, plan views for describing a method by which the wavelength-selective polarization rotating element is held via the holding member by the polarization beam splitter in the optical unit of Embodiment 1.

In making the wavelength-selective polarization rotating element 15 be held by the holding frame 22, the wavelength-selective polarization rotating element 15 is adhered onto the holding frame 22 using an adhesive agent (second adhesive agent) 30, with the wavelength-selective polarization rotating element 15 being put in contact with the polarization rotating element side reference surface 22c as shown in FIG. 4(A). The wavelength-selective polarization rotating element 15 is thus held by holding frame 22 (in other words by the RB polarization beam splitter 14) in a state in which movement with respect to the RB polarization beam splitter 14 in the direction of the optical axis (the optical axis of the RB light components which emerges from the RB polarization beam splitter 14) and tilting with respect to this optical axis are prevented.

Here, an adhesive agent, with which the hardness after curing is lower (softer) than the material hardness of the wavelength-selective polarization rotating element 15 is used as the adhesive agent 30. Specifically, a soft, silicone-based adhesive agent is preferable for this embodiment. This is because the wavelength-selective polarization rotating element 15 is in itself a polycarbonate plate with a thickness of approximately 0.7 mm, is readily deformable, and yet must be held without straining as much as possible.

If an adhesive agent which is harder than the material hardness of the wavelength-selective polarization rotating element 15 is used, the wavelength-selective polarization rotating element 15 will be strained by the expansion of the adhesive agent, causing distortion of the transmission wave plane and degradation of the projected image. This also causes photoelasticity to occur.

Since the linear expansion coefficients of the wavelength-selective polarization rotating element 15 and the holding frame 22 are equal or close to each other, straining should basically not occur even if these components are fixed strongly to each other. However, if these components do differ in heat absorption states and differ in expansion amount, the difference in expansion amount is absorbed by the deformation of the adhesive agent 30.

Figure 4B:
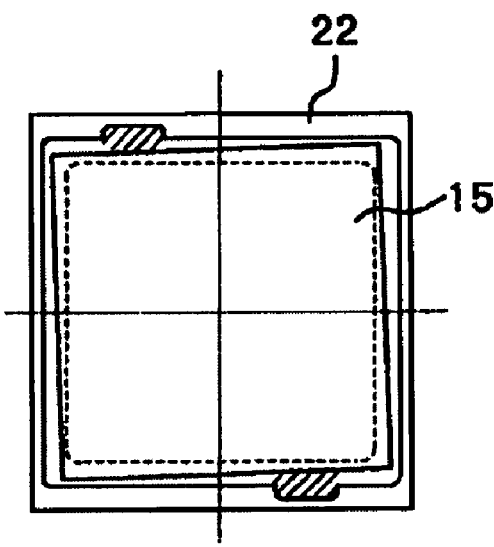

Also, if as shown in FIG. 4(A), the adhesive agent 30 is applied at two positions as viewed from the front, and the sides 15c of the wavelength-selective polarization rotating element 15 at which the adhesive agent 30 is applied are not orthogonal to the line joining the two positions of application of the adhesive agent 30, stresses can be relieved by rotation of the wavelength-selective polarization rotating element 15 within the plane orthogonal to the optical axis (emergence optical axis of the RB light components) as shown in FIG. 4(B).

The arrangement of this invention in which the wavelength-selective polarization rotating element 15 is rotated within the plane orthogonal to the optical axis to relieve the stress provides the characteristic that even if the wavelength-selective polarization rotating element 15 undergoes a slight tilting, rotation, or other form of change with respect to the optical axis, the polarization rotation performance will not be influenced as well as the characteristic which registration deviation will not occur as long as tilting with respect to the optical axis does not occur.

The causes of occurrence of stress lie in the difference between the linear expansion coefficients of the wavelength-selective polarization rotating element 15 and the holding frame 22 if there is such a difference, the difference in expansion amount which arises due to the difference in the heating states of the wavelength-selective polarization rotating element 15 and the holding frame 22, and the expansion of the adhesive agent 30. The stress can be caused by expansion of the adhesive agent 30 since if a soft silicon-rubber adhesive agent is selected as the adhesive agent 30, its linear expansion coefficient will be comparatively large, that is, approximately $30 \times 10^{-5}$ and the expansion amount will be large in proportion to the application area.

In a case where the holding frame 22 and the RB polarization beam splitter 14 expand respectively due to a temperature rise, etc. inside the projector, the gaps H, at which the adhesive agent 31 was applied, enlarge and become gaps H' as shown in FIG. 2(A) due to the difference in thermal expansion coefficient between the two components. An adhesive agent, with which the hardness after curing is lower (softer) than the material hardness of the holding frame 22, specifically, a soft, silicone-based adhesive agent, is thus used as the adhesive agent 31. In this case, even when the gaps H enlarge to H' due to the difference in thermal expansion coefficient, this difference in thermal expansion coefficient can be absorbed by the stretching of the adhesive agent 31 and the state of adhesion of the holding frame 22 to the RB polarization beam splitter 14 can thus be maintained.

And by providing the above-described holding structure, even if the holding frame 22 becomes deformed, the strain thereof can be prevented from being transmitted to the wavelength-selective polarization rotating element 15 and the RB polarization beam splitter 14.

The RB polarization beam splitter 14 also has enough factors to give rise to photoelasticity such that glass, which is low in photoelastic coefficient, is selected as the material in the design stage.

Also, though not illustrated in the present embodiment, a $\lambda/4$ plate (¼-wave plate) is generally provided between the polarization beam splitter and the liquid crystal panel to align the polarization. As with a polarizing plate, since a $\lambda/4$ plate is a film-like optical element, it is used upon adhesion onto glass or other transparent member.

As methods of attachment, there is a method of directly adhering the $\lambda/4$ plate film upon adjustment of the phase direction onto the adjacent polarization beam splitter, and a method of adhering the $\lambda/4$ plate onto a general-purpose plate glass of approximately 1.1 mm thickness and fixing via an indirect holding member made of plastic or metal.

Figure 8:
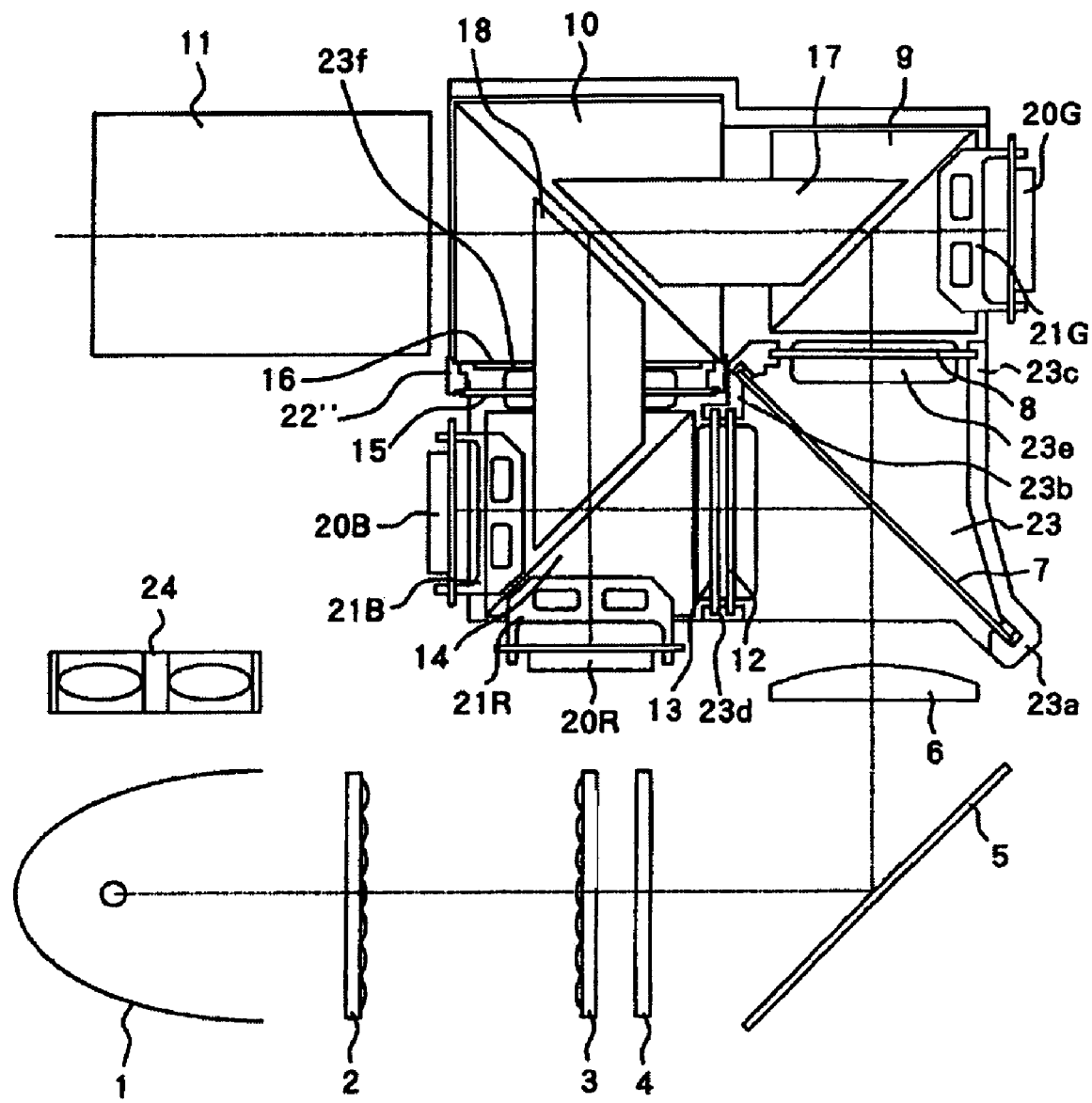
FIG. 8 is a plan view showing the arrangement of an optical unit for liquid crystal projector, which is Embodiment 4 of this invention.

Though there will be no problems in the case where the $\lambda/4$ plate is adhered directly onto the polarization beam splitter, in the case where the $\lambda/4$ plate is adhered onto plate glass and held via an indirect holding member, attention must be paid to displacements of the optical axis, such as shown in FIG. 8, and the $\lambda/4$ plate must be held so that rotation will not occur and give rise to deviation from an appropriate optimal phase position.

Though the present embodiment is mainly focused on the method of holding the wavelength-selective polarization rotating element and detailed description of the method of holding the $\lambda/4$ plate will be omitted, since photoelasticity also occurs at the plate glass onto which the $\lambda/4$ plate is adhered, it is preferable to select a material of low photoelastic coefficient and to employ a holding method which will not strain the plate glass.

Figure 5:
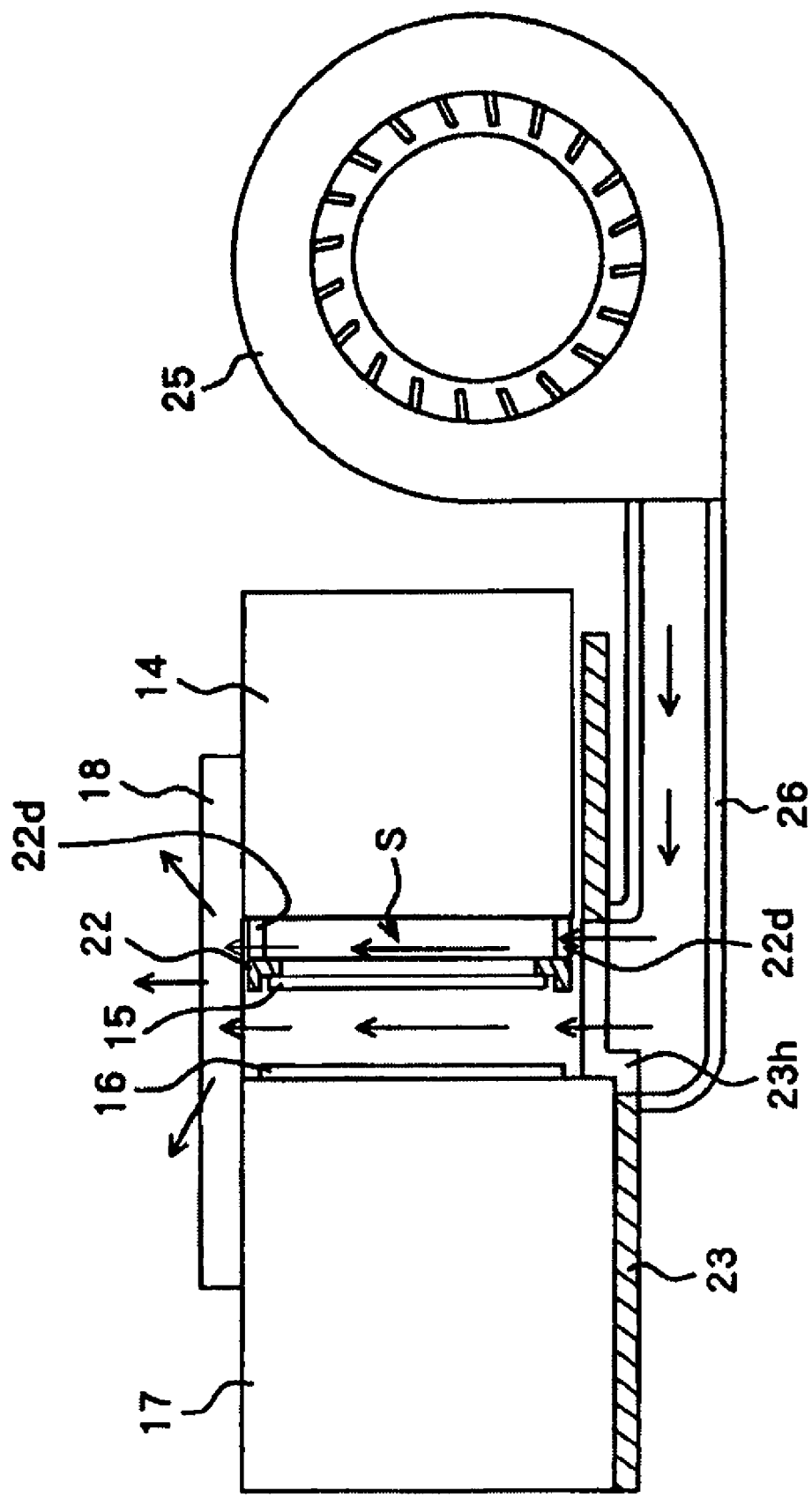
FIG. 5 is a sectional side for describing a method of cooling the optical unit of Embodiment 1.

FIG. 5 shows a transverse section of the optical unit of the present embodiment. As shown in FIG. 5, a gap S is formed between the RB polarization beam splitter 14 and the wavelength-selective polarization rotating element 15, which is held via the holding frame 22 by the RB polarization beam splitter 14. Also as shown in FIG. 3, notched portions 22d are formed at upper and lower portions of the holding frame 22 for opening the abovementioned gap (cooling air path) S in the vertical direction.

As indicated by the arrows in the figure, a portion of the cooling air, which is guided from a high-pressure cooling fan 25 to a duct 26 and passes through an opening portion 23h formed in the base 23, flows into the gap S via the lower notched portion 22d of the holding frame 22 and passes upwards through the upper notched portion 22d of the holding frame 22. Also, the rest of the cooling air which passes through the opening portion 23h of the base 23 flows upwards through the space between the wavelength-selective polarization rotating element 15 and the emergence side polarizing plate 16.

By the cooling air thus flowing along both surfaces of the wavelength-selective polarization rotating element 15, the wavelength-selective polarization rotating element 15 is cooled efficiently and kept at a temperature which is as close as possible to the room temperature.

Since there is considerable light energy absorption, etc. at the emergence side polarizing plate 16 as well, this is also cooled by the cooling air so that it will not be put in an overheated state.

Furthermore, since the RB polarization beam splitter 14 is also heated by radiation, convection, conduction, and other causes from liquid crystal panels 20B and 20R, it is cooled by the abovementioned cooling air to restrain the occurrence of photoelasticity as much as possible.

(Embodiment 2)

Figure 6A:
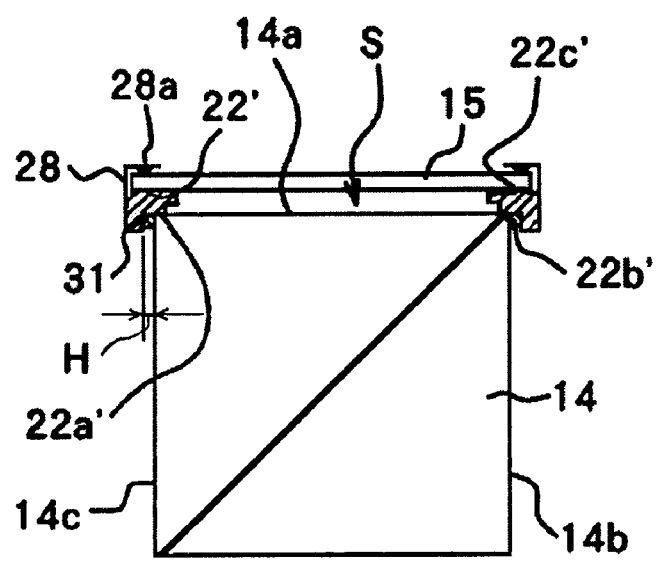
FIGS. 6(A) 6(B) are, respectively, a plan view and a front view for explaining a method by which a wavelength-selective polarization rotating element is held via a holding member by a polarization beam splitter in an optical unit for liquid crystal projector, which is Embodiment 2 of this invention.
Figure 6B:
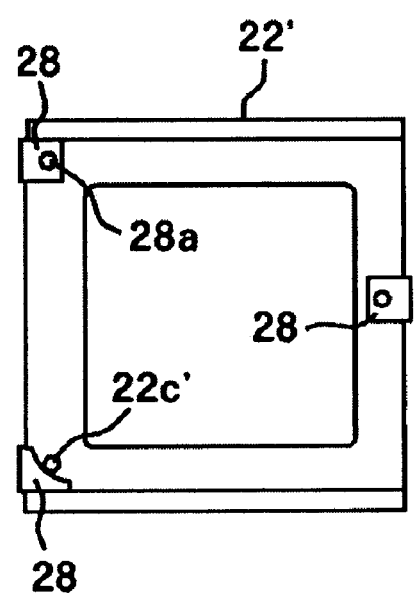

FIG. 6(A) and FIG. 6(B) show an RB polarization beam splitter 14 and a wavelength-selective polarization rotating element 15, held via a holding frame 22' by the RB polarization beam splitter 14, which are used in an optical unit for liquid crystal projector which is Embodiment 2 of this invention. The other elements which make up the optical unit are the same as those of Embodiment 1. However, the holding structure for the wavelength-selective polarization rotating element 15 of this embodiment differs from that of Embodiment 1.

The holding frame 22' has a beam splitter side reference surface 22a', which contacts peripheral portions of the RB light components emergence surface 14a of the RB polarization beam splitter 14, an adhered surface 22b', which is positioned across gaps H from peripheral portions of the incidence surface 14b of the RB polarization beam splitter 14 for the RB light components from the illumination system and peripheral portions of the B light component incidence/emergence surface 14c which opposes the liquid crystal panel 20B, and polarization rotating element side protrusions (supporting portions) 22c', which are formed as semispherical protrusions at three locations (see FIG. 6(B)) at the opposite side of the beam splitter side reference surface 22a' and are put in contact with the inner surface (first surface) of the wavelength-selective polarization rotating element 15. Also though not illustrated, the same notched portions (22d) as those of the holding frame 22 of Embodiment 1 are formed at upper and lower parts of the holding frame 22'.

As in Embodiment 1, the holding frame 22' is preferably made of polycarbonate, which is the same as the principal material of the wavelength-selective polarization rotating element 15, or a material which is close to polycarbonate in linear expansion coefficient.

The same adhesive agent 31 as that described for Embodiment 1 is applied between the adhered surface 22b' and the incidence surface 14b and the incidence/emergence surface 14c of the RB polarization beam splitter 14, with the beam splitter side reference surface 22a' being put in contact with the emergence surface 14a of the RB polarization beam splitter 14, and the holding frame 22' is thereby adhered onto the RB polarization beam splitter 14.

Furthermore, leaf springs (elastic portion) 28 are mounted at three locations corresponding to the positions at which the polarization rotating element side protrusions 22c' of the holding frame 22' are disposed. With each of these leaf springs 28, a semispherical protrusion 28a is formed at a part extending to the position opposing the corresponding polarization rotating elements side protrusion 22c'. The leaf spring 28 presses the outer surface (second surface) of the wavelength-selective polarization rotating element 15 toward the portion 22c'.

By the wavelength-selective polarization rotating element 15 being sandwiched between the protrusions 28a of the leaf springs 28 and the polarization rotating element side protrusions 22c' by the spring forces of the leaf springs 28, the wavelength-selective polarization rotating element 15 is held by the holding frame 22' (that is, by the RB polarization beam splitter 14) in a state in which movement in the direction of the optical axis (emergence optical axis of RB light components) of the RB polarization beam splitter 14 and tilting with respect to this optical axis are prevented and yet movement (rotation, etc.) within the plane orthogonal to the abovementioned optical axis is allowed.

By sandwiching the wavelength-selective polarization rotating element 15 at the points of the protrusions 28a of the leaf springs 28 and the polarization rotating element side protrusions 22c' of the holding frame 22', the plate-like wavelength-selective polarization rotating element 15 can be held in a manner such that a bending force will not be applied thereto. Also, since by holding at three positions, the plate-like polarization rotating element 15 can be held in a stable manner in which the planar shape is maintained and a wrenching force is not applied, the generation of stress inside the wavelength-selective polarization rotating element 15 can be restrained.

If the number of holding positions is increased to four, since one point will always fall outside the plane passing through the other three points, a bending force will be applied to the wavelength-selective polarization rotating element 15. Also, if the spring forces of the leaf springs 28 are set to levels by which the load of the wavelength-selective polarization rotating element 15 can be supported, since the holding points will shift along the wavelength-selective polarization rotating element 15 even when the wavelength-selective polarization rotating element 15 and the holding frame 22 differ in expansion amount, the expansion amount difference can be absorbed.

Also, expansion of the wavelength-selective polarization rotating element 15 in the plate thickness direction can be absorbed by the flexing of leaf springs 28.

As in Embodiment 1, cooling air is passed through a gap S, formed between the wavelength-selective polarization rotating element 15, which is held in holding frame 22', and the RB polarization beam splitter 14, to restrain the occurrence of photoelasticity due to temperature rise of the wavelength-selective polarization rotating element 15 and the RB polarization beam splitter 14 in the present embodiment as well.

(Embodiment 3)

Figure 7A:
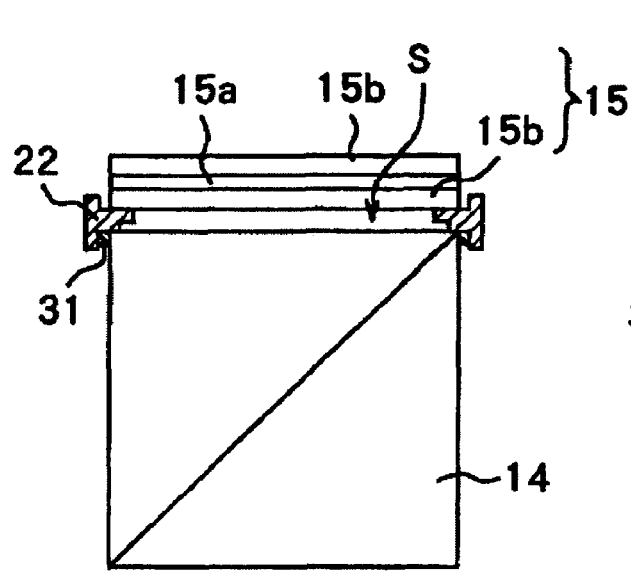
FIGS. 7(A) 7(B) are, respectively, plan views for explaining a method by which a wavelength-selective polarization rotating element is held via a holding member by a polarization beam splitter in an optical unit for liquid crystal projector, which is Embodiment 3 of this invention.
Figure 7B:
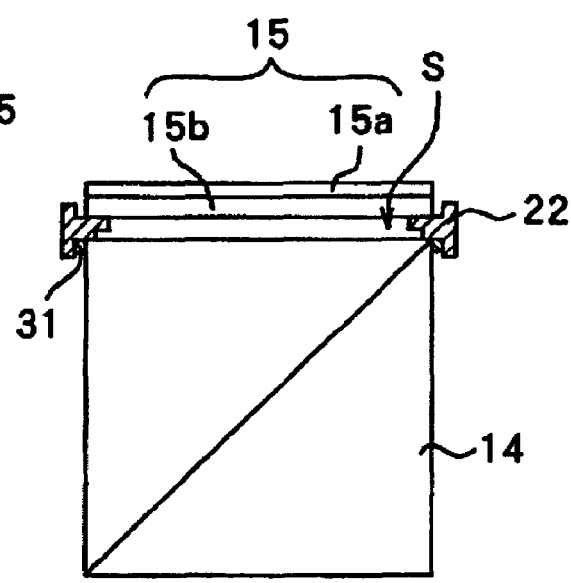

FIG. 7(A) and FIG. 7(B) show an RB polarization beam splitter 14 and a wavelength-selective polarization rotating element 15, held via a holding frame 22 by the RB polarization beam splitter 14, which are used in an optical unit for liquid crystal projector which is Embodiment 3 of this invention. The other elements which make up the optical unit are the same as those of Embodiment 1.

With this embodiment, the wavelength-selective polarization rotating element 15 comprises a main element body (polycarbonate layer) 15a, having polycarbonate as the principal material, and two or one glass substrates (glass layers) 15b, adhered to both surfaces or one surface of the main element body 15a.

FIG. 7(A) shows a case where the wavelength-selective polarization rotating element 15 is arranged with two glass substrates 15b being adhered to the respective surfaces of the main element body 15a, and FIG. 7(B) shows a case where the wavelength-selective polarization rotating element 15 is arranged with one glass substrate 15b being adhered to one surface (a surface at the RB polarization beam splitter 14 side) of the main element body 15a.

Glass substrates become necessary in cases where the size of the effective display range of a liquid crystal panel is large, the rigidity of a polycarbonate material of approximately 0.7 mm thickness is not adequate, and there is thus a possibility for the wavelength-selective polarization rotating element 15 itself to undergo deformation readily and cause degradation of the optical transmission wave plane.

In such a case where the wavelength-selective polarization rotating element 15, with which glass substrates 15b are adhered onto a main element body 15a of polycarbonate material, is used, the holding frame 22 will be holding the strong glass substrate 15b and though the material thereof is thus not restricted in particular, it is preferable for the material to be low in thermal conductivity, so that the heat from the RB polarization beam splitter 14 is prevented as much as possible from being conducted to the wavelength-selective polarization rotating element 15, and yet be close to the glass substrate 15b in linear expansion coefficient. For example, a polycarbonate material containing glass fibers or epoxy-based thermosetting resin material is suited.

As with Embodiment 1 (or Embodiment 2), the holding frame 22 holds the wavelength-selective polarization rotating element 15 with respect to the RB polarization beam splitter 14 in a manner such that the movement thereof in the direction of the emergence optical axis of the RB light components is prevented and yet movement within the plane orthogonal to the abovementioned emergence optical axis is allowed with the present embodiment as well.

Also as with Embodiment 1, cooling air is passed through a gap S, formed between the wavelength-selective polarization rotating element 15, which is held in holding frame 22, and the RB polarization beam splitter 14, to restrain the occurrence of photoelasticity due to temperature rise of the wavelength-selective polarization rotating element 15 and the RB polarization beam splitter 14 in the present embodiment as well. The generation of stress between the glass plate 15b and the RB polarization beam splitter 14 can also be restrained thereby and the heat conducted from the RB polarization beam splitter 14 to the wavelength-selective polarization rotating element 15 can be reduced significantly as well.

(Embodiment 4)

FIG. 8 shows an optical unit for liquid crystal projector which is Embodiment 4 of this invention. The components of this optical unit are the same as those of Embodiment 1.

The present embodiment differs from Embodiments 1 to 3 in which the wavelength-selective polarization rotating element 15 is held via a holding frame 22" by a combining polarization beam splitter 10.

Since an RB polarization beam splitter 14 and the combining polarization beam splitter 10 are connected firmly by a glass plate 18 and a G polarization beam splitter 9 and the combining polarization beam splitter 10 are connected firmly by a glass plate 17, even when temperature rises and other various environmental changes occur during the operation of the projector or even when vibration or impact is applied, the mutual positional relationships of the polarization beam splitters 9, 10, and 14 do not change.

The wavelength-selective polarization rotating element 15 can thus be held by the RB polarization beam splitter 14 or the G polarization beam splitter 9 or the glass plate 17 or 18 or the combining polarization beam splitter 10.

However, in regard to the actual holding of the wavelength-selective polarization rotating element 15 at good precision by a component besides the RB polarization beam splitter 14, the wavelength-selective polarization rotating element 15 is preferably held by the combining polarization beam splitter (first optical element) 10, which is adjacent the wavelength-selective polarization rotating element 15.

Thus in the present embodiment, the wavelength-selective polarization rotating element 15 is held via the holding frame 22" by the combining polarization beam splitter 10. Accordingly, the shape of a column portion 23b, formed on a base 23, is differed from that of Embodiment 1 (see FIG. 1).

In the present embodiment, the position of the wavelength-selective polarization rotating element 15 is set close to the RB polarization beam splitter 14. This is done to secure as much distance as possible from the polarizing plate 16, which is a heat generating source, and thereby make the heat of the polarizing plate 16 be less likely to be conducted to the wavelength-selective polarization rotating element 15.

The shape and material (linear expansion coefficient) of the holding frame 22" are the same as those described for Embodiments 1 to 3.

With the respective embodiments described above, the occurrence of leakage light from a wavelength-selective polarization rotating element and registration deviation due to the tilting of the wavelength-selective polarization rotating element can be restrained while making use of the excellent characteristics of reflection type liquid crystal display elements, thus enabling projected images of high contrast to be obtained.

Also with the respective embodiments described above, the usage efficiency of light can be increased and the load placed on the polarizing plate and other light absorbing optical elements can be reduced. The cooling ability required for the polarizing plate, which is a heat generating source, can thus be reduced, and the embodiments are also effective for the lowering of noise by the lowering of the rotation speed of the cooling fan.

Though with the respective embodiments described above, methods of holding a wavelength-selective polarization rotating element were described, these methods may also be applied to the holding of a polarizing plate, a phase plate, or other optical element (a second optical element which acts optically on one of incident light onto a polarization beam splitter and other first optical element and emergent light from the first optical element).

While preferred embodiments have been described, it is to be understood that modification and variation of the present invention may be made without departing from scope of the following claims.

What is claimed is:

1. An optical unit used in a projection type image display apparatus, the optical unit comprising:
a first optical element which performs at least one of color separation and color combination of light;
a holding member attached to the first optical element; and
a second optical element held by the holding member, the second optical element acting optically on one of incident light onto the first optical element and emergent light from the first optical element,
wherein the holding member includes a holding structure holding the second optical element, the holding structure preventing the displacement of the second optical element in an optical axis direction of the first optical element which passes through the second optical element and allowing the rotation of the second optical element in a plane orthogonal to the optical axis direction;
wherein the second optical element is held by the holding member by means of an adhesive agent, the hardness after curing of the adhesive agent being less than the hardness of the material of the second optical element; and
wherein the adhesive agent is applied to a part of respective opposite sides of the second optical element and the each side is not orthogonal to a line jointing two application positions of the adhesive agent.

2. The optical unit according to claim 1,
wherein the first optical element is formed of a glass material and the second optical element is formed of a resin material; and
wherein the following condition is satisfied:

$$a1 < a3 \leq a2$$

where a1, a2, and a3 represent linear expansion coefficients of the materials forming the first optical element, the second optical element, and the holding member, respectively.

3. The optical unit according to claim 2, wherein the a3 is closer to the a2 than to the a1.

4. The optical unit according to claim 1, wherein the first optical element is formed of glass and the second optical element is formed of resin.

5. The optical unit according to claim 1, wherein the holding member is attached to the first optical element by an adhesive agent, the hardness after curing of the adhesive agent being less than the hardness of the material of the holding member.

6. The optical unit according to claim 1, wherein a gap for passage of cooling air is formed between the first optical element and the second optical element.

7. The optical unit according to claim 1, wherein the second optical element is a wavelength-selective polarization rotating element.

8. A projection type image display apparatus comprising:
a plurality of image forming elements, each forming an original image;
a projection lens; and
an optical system which comprises the optical unit according to claim 1 and guides light from the plurality of image forming elements to the projection lens.

* * * * *